(12) United States Patent
Huber

(10) Patent No.: US 7,236,301 B2
(45) Date of Patent: Jun. 26, 2007

(54) POLARIZED LIGHT VALVE

(75) Inventor: Mark Joseph Huber, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 10/875,541

(22) Filed: Jun. 23, 2004

(65) Prior Publication Data

US 2005/0286127 A1 Dec. 29, 2005

Related U.S. Application Data

(60) Provisional application No. 60/481,012, filed on Jun. 23, 2003, provisional application No. 60/481,013, filed on Jun. 23, 2003.

(51) Int. Cl.
*G02B 27/28* (2006.01)

(52) U.S. Cl. .......................... 359/501; 472/71

(58) Field of Classification Search .............. 40/548, 40/446, 434; 283/90
See application file for complete search history.

(56) References Cited

U.S. PATENT DOCUMENTS

| | | | | |
|---|---|---|---|---|
| 2,184,138 A * | 12/1939 | Corey | ............................ | 472/61 |
| 2,700,919 A * | 2/1955 | Boone | ........................... | 359/498 |
| 2,882,631 A * | 4/1959 | Boone | ........................... | 359/489 |
| 2,977,845 A * | 4/1961 | Boone | ........................... | 352/87 |
| 3,647,284 A | 3/1972 | Elings et al. | ................. | 359/858 |
| 4,026,066 A | 5/1977 | Reiner et al. | ................ | 446/236 |
| 4,094,501 A | 6/1978 | Burnett | .......................... | 472/63 |
| 4,500,088 A | 2/1985 | Lasky | ............................ | 40/489 |
| 4,613,128 A | 9/1986 | Lasky | ............................ | 40/489 |
| 5,346,433 A | 9/1994 | Weinreich | ...................... | 472/63 |
| 5,368,309 A | 11/1994 | Monroe et al. | ................. | 463/34 |
| 5,421,589 A | 6/1995 | Monroe | ........................... | 345/9 |
| 5,543,870 A | 8/1996 | Blanchard | ...................... | 353/74 |
| 5,585,967 A | 12/1996 | Monroe | ........................ | 359/629 |
| 5,639,151 A | 6/1997 | McNelley et al. | .............. | 353/98 |
| 5,779,552 A | 7/1998 | Gelfond et al. | ................ | 472/67 |
| 5,890,787 A | 4/1999 | McNelley et al. | .............. | 353/28 |
| 5,999,317 A * | 12/1999 | Whitney | ........................ | 359/501 |
| 6,042,235 A | 3/2000 | Machtig et al. | ................ | 353/28 |
| 6,147,934 A * | 11/2000 | Arikawa et al. | ................ | 368/84 |
| 6,385,139 B1 | 5/2002 | Arikawa et al. | .............. | 368/239 |

FOREIGN PATENT DOCUMENTS

WO   WO 9517692 A1 *   6/1995
WO   WO 9527919 A2 *  10/1995

* cited by examiner

*Primary Examiner*—Stephone B. Allen
*Assistant Examiner*—Derek S. Chapel
(74) *Attorney, Agent, or Firm*—Greenberg Traurig LLP

(57) ABSTRACT

A projection system for making an object appear and disappear to an observer on cue. The system remotely activates a reflective axis and a transmissive axis within a polarized window for making an object on cue appear and disappear. In one aspect, this system contains a reflective back plate, a polarized window, and a textured surface. A reflective back plate is placed behind an object. A polarized window is placed in front of the object. A textured surface is placed in front of the polarized window. A polarized light source is placed in front of the textured surface. If the polarized light is aligned parallel to a reflective axis, the textured surface is visible to an observer. If the polarized light is aligned parallel to the transmissive axis, the textured surface and the object are visible to an observer.

21 Claims, 4 Drawing Sheets

//POLARIZED LIGHT VALVE

RELATED APPLICATIONS

This application claims priority to U.S. Provisional Application No. 60/481,012 entitled "POLARIZED LIGHT VALVE" filed on Jun. 23, 2003 and is related to U.S. Provisional Application No. 60/481,013 entitled "POLARIZED APPEARING AND DISAPPEARING OBJECT SYSTEM" filed on Jun. 23, 2003. The above-referenced applications' contents are incorporated by reference herein in their entirety.

BACKGROUND

1. Field

This disclosure relates to making an object appear hidden or visible to an observer.

2. General Background

Special effects designers may be required to make an object appear hidden (disappear) or visible (appear) to an observer on cue. For example, an amusement park having a haunted mansion may desire to make an object, such as a ghost, mysteriously appear and as just as mysteriously disappear to an observer. One conventional approach involves a projection system having an electromechanical means for directing light at and redirecting light from an object. However, this approach may not to an observer make an object disappear or reappear because such electromechanical means requires a finite time for turning on and turning off a light source illuminating the object. Furthermore, this approach may not smoothly nor in a controllable manner transition from hidden to visible an object to an observer on cue.

Thus, there is a need for an improved process for making an object appear hidden or visible to an observer and provide other advantages over presently available projection systems.

SUMMARY

An improved optical system as disclosed herein uses optical polarizers wherein changing the relative orientation of the optical polarizers provides for an image of an object to appear and to disappear from behind a surface. For example, the optical system may be a projection system wherein an object appears visible, or disappears and becomes invisible to an observer.

In one aspect, the projection system is a thin film system. A reflective back plate is placed behind an object. A polarized window is placed in front of the object. The polarized window is a thin film surface having a reflective axis and a transmissive axis. The transmissive axis transmits light that vibrates in the same plane as the transmissive axis. The reflective axis reflects light that vibrates in the same plane as the reflective axis. The textured surface, for example, is a semi-transparent surface. The polarized window is for example a thin film surface. The textured surface is placed in front of the polarized window. A light source placed in front of the textured surface is adapted to polarize light transmitted toward the textured surface. The light source remotely activates the projection system by changing the light polarization. Depending on the polarization of the light source, the object may be made invisible or visible to an observer.

In one aspect, the polarization of the light source is oriented parallel to the reflective axis. In this aspect, the light passes through the textured surface and is reflected by the polarized window, preventing viewing of the object. In another aspect, the polarization of the light source is oriented parallel to the transmissive axis. In this aspect, the light passes through the textured surface and the polarized window displays a visible object and the textured surface.

In another embodiment, the polarization of the light source is transitioned from parallel to the transmissive axis to parallel to the reflective axis. The effect is to create an optical cross fade of the object from a visible state to an invisible state. In one aspect, the transition involves two states for appearance (visibility) to disappearance (invisibility) of the object to an observer. In the alternative, the transition is gradual involving multiple states from the appearance of an object (visible), through partial visibility of the object, to the disappearance (invisibility) of the object to an observer. The effect of having multiple states allows the appearance and the disappearance of the object to slowly fade from one state to another state. The polarizing window may be thin film material applied directly to a wall. Therefore, the disappearance and appearance of the object to an observer is created in a very small real estate area.

For instance, special effects design engineers for studios or movie houses may utilize this improved optical system for creating disappearing and appearing image of an object, such as ghost. Some other applications of this system include convenience stores, point of sales displays, train stations, or other locations where an image of an object is periodically displayed on a remotely located wall or other surface. In yet another example, the application of a polarized light source, such as a flashlight, to an object produces a real image of the object appearing in corners or crevices of a room and other random remote locations. This creates the effect of a scary environment for haunted house attendees.

The foregoing and other objects, features, and advantages of the present disclosure will be become apparent from a reading of the following detailed description of exemplary embodiments thereof, which illustrate the features and advantages of the disclosure in conjunction with references to the accompanying drawing figures.

DETAILED DESCRIPTION

The present disclosure involves using a polarized light projector and polarization materials that have different orthogonal polarization characteristics in order to make an object hidden (disappear) or visible (appear) to an observer on cue. Through this disclosure, an observer is only exemplary in nature and may be replaced by a video camera, recording device, screen, or the like.

Figure 1A:
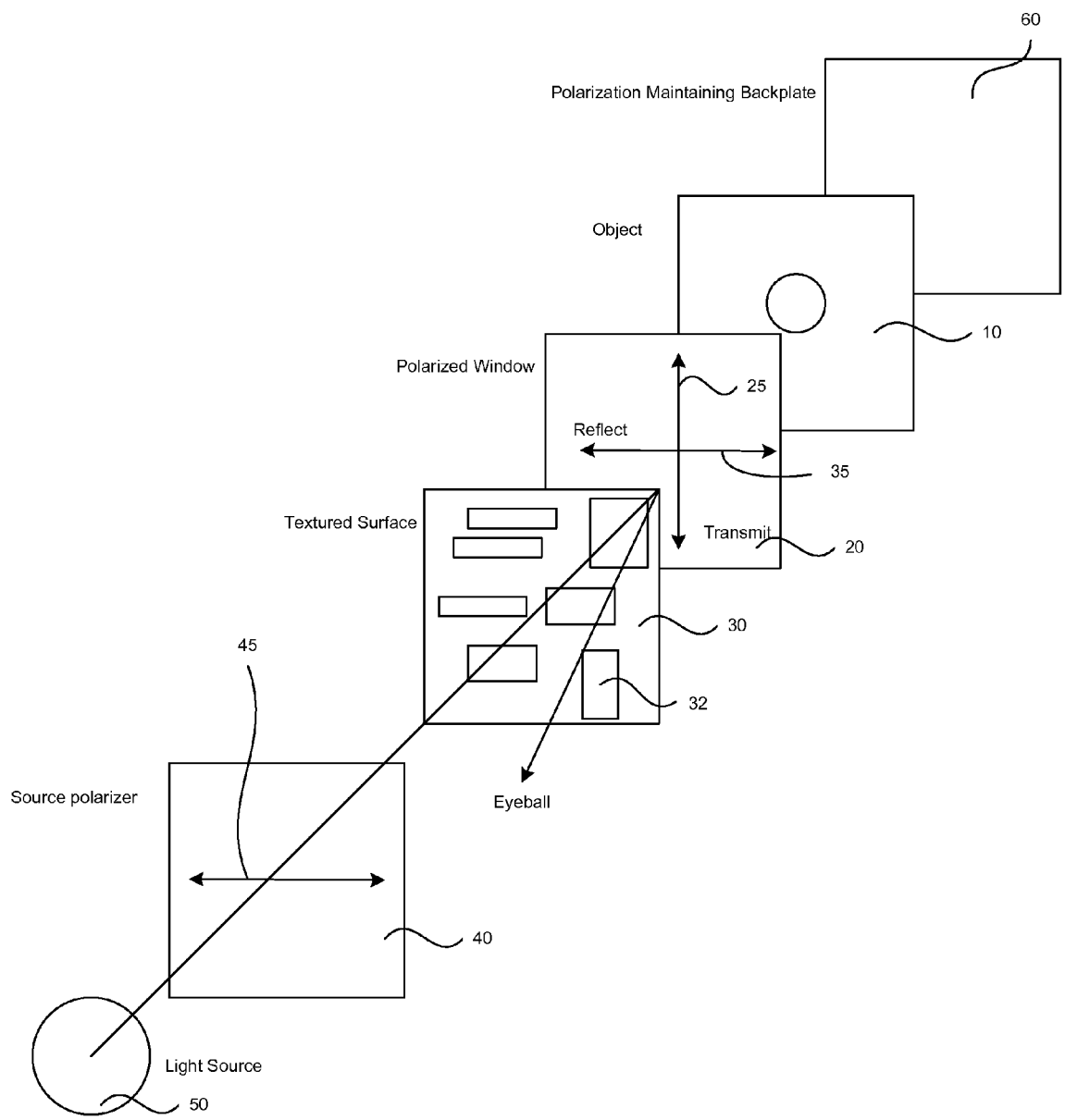
FIGS. 1A and 1B illustrate one embodiment where an object is hidden from an observer.
Figure 1B:
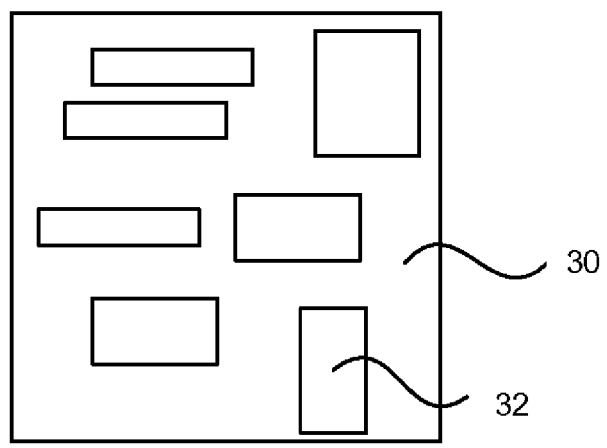

FIGS. 1A and 1B illustrate one embodiment where an object is invisible (hidden) to an observer. This optical system includes source polarizer 40, textured window 30, a polarized window 20, and an object 10. In one aspect, object 10 may consist of a thin film material deposited on a clear acetate material. In one aspect, the thin film material may be clear acetate material deposited with images such as a cartoon character, a text message, or characters. The thin film material occupies a very small real estate area so it can be incorporated in small real estate area. In another aspect, object 10 may be, for example, a 3-dimensional object such as a figurine.

Textured surface 30 is a semi-transparent surface. For example, textured surface 30 is a clear acetate material deposited with, for example, a thin film material like brick surface 32.

Polarized window 20 is dual polarized window having both a transmissive axis 25 and a reflective axis 35 to light. In one example, polarized window 20 is a light polarizing film Diffuse Reflective Polarizing Film (DRPF) from manufacturer 3M.

Source polarizer 40 includes a first transmissive axis 45 which transmits light vibrating in the same plane as transmissive axis 45. Light aligned along first transmissive axis 45 passes through source polarizer 40. In one aspect, source polarizer 40 is a light polarizing material such as Moxtek, aluminum deposited on glass, or an organic polarizer such as Hn-38 manufactured by the 3M Company.

Light source 50 is an illumination source such as an ETC Source Four with 750 watts illumination power or the like.

In this system, object 10 is placed behind polarized window 20. Textured surface 30 is placed behind source polarizer 40. Light from light source 50 illuminates source polarizer 40. Source polarizer 40 has a first transmissive axis 45 aligned with reflective axis 35 of polarized window 20. Source polarizer 40 passes light aligned along first transmissive axis 45 toward textured surface 30. Light passes through textured surface 30 to polarized window 20. Light aligned with reflective axis 35 of polarized window 20 is reflected back toward textured surface 30. An observer sees an illuminated textured surface 30, as shown for example in FIG. 1B, with brick elements 32.

Figure 2A:
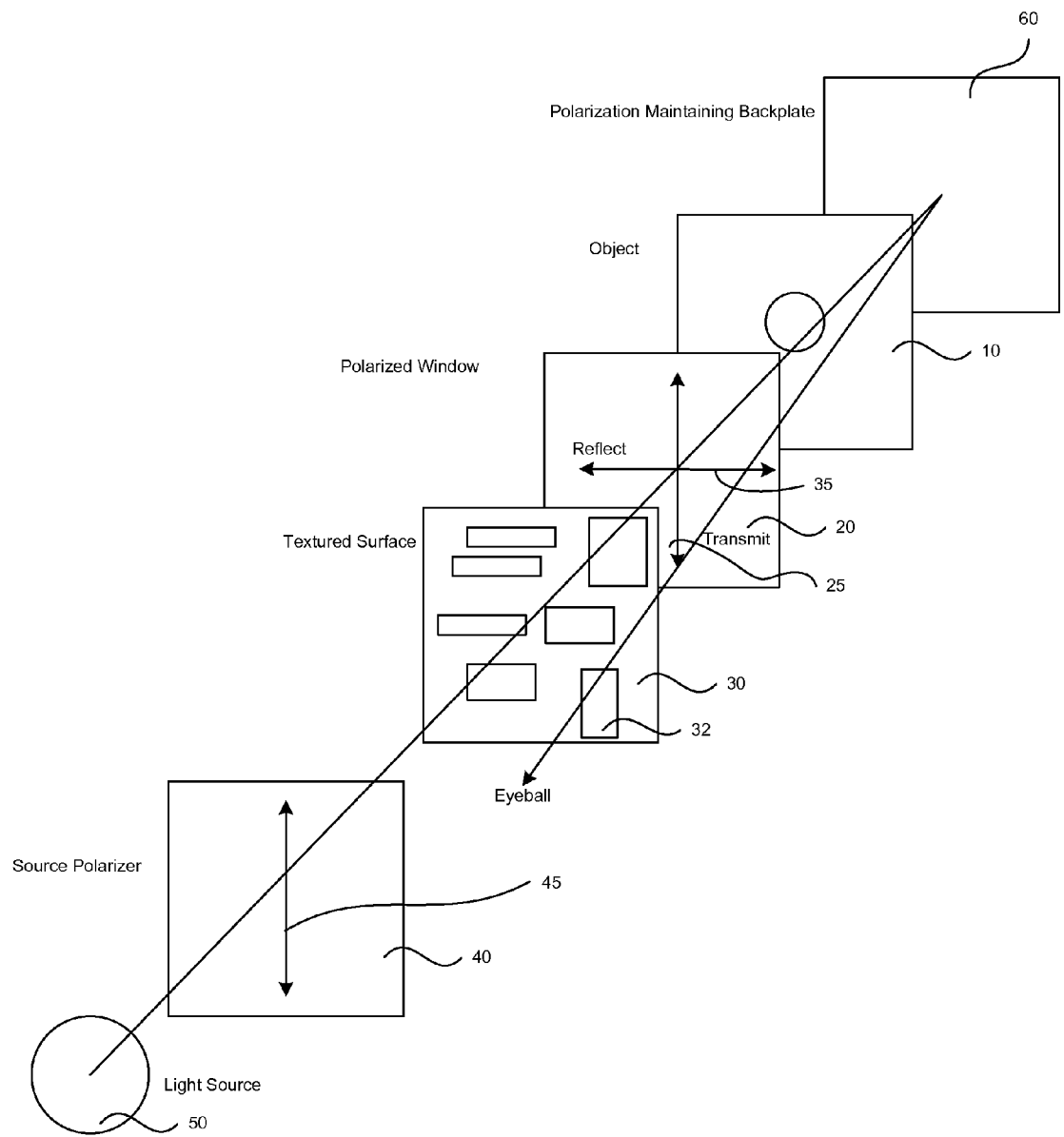
FIGS. 2A and 2B illustrate one embodiment where an object is visible to an observer.

FIG. 2A illustrates one embodiment where an object is made visible to an observer. In this aspect, light source 50 transmits light to source polarizer 40. Light aligned along transmissive axis 45 of source polarizer 40 travels through textured surface 30. Light transmitted by textured surface 30 that aligns with transmissive axis 25 of polarized window 20 travels to object 10. Object 10 transmits light to back plate 60.

Back plate 60 is a polarization-maintaining surface. For example, back plate 60 may be plexiglass or acrylic material such as made by manufacturer Autoglass or the like. In another example, back plate 60 is deposited with a reflective material such as Krylon 1401 silver paint.

Figure 2B:
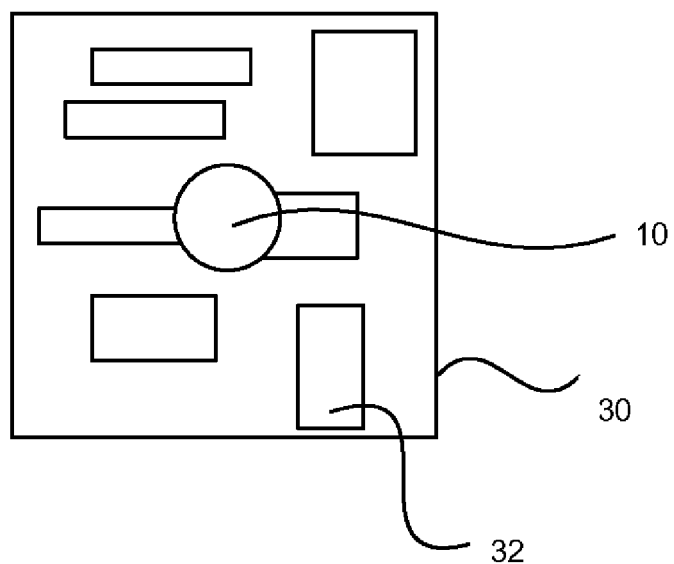

Light from back plate 60 travels through object 10. Object 10 is illuminated. Object 10 passes light to polarized window 20. Light aligned along transmissive axis 25 of polarized window 20 is transmitted to textured surface 30. Textured surface 30 is illuminated. An observer sees textured surface 30 plus visible image of object 10 as shown in FIG. 2B.

In one alternative, the polarization of the light source may be slowly transitioned from parallel to the transmissive axis to parallel to the reflective axis. This effect provides for a user to create optical cross fade of the object to an observer from a visible state to an invisible state.

For example, as source polarizer 40 is rotated clockwise, object 10 visibility changes from a visible state to an invisible state. In another example, source polarizer 40 rotates either clockwise or counter clockwise direction providing to an observer an object's visibility that cyclically changes from a visible state, through numerous partially visible states, a nearly visible state, and to a visible state.

In one aspect, the transition is done in a user-controlled manner. The transition involves two states for appearance (visibility) to disappearance (invisibility) of the object to an observer. In the alternative, the transition is gradual, involving multiple states from the appearance of an object (visible), through partial visibility of the object, to the disappearance (invisibility) of the object to an observer. Multiple states allow an observer to see an object slowly fade from one state to another state. Polarizing window 40 may be thin film material applied directly to a wall. Therefore, the disappearance and appearance of the object to an observer can be created in a very small real estate area.

In one aspect, the background remains the same color as the visibility of the object transitions from a visible state to an invisible state. For example, polarized window 40 is a Diffuse Reflective Polarizing Film (DRPF) from the 3M Company. In this example, the background remains white as object 10 transitions from the visible state to the invisible state. In another aspect, polarized window 40 is the Dual Brightness Enhancement Film (DBEF) from the manufacturer 3M. In this aspect, the background remains silver as object 10 transitions from the visible state to the invisible state.

In another aspect, textured surface 30 can be any transparent substance. In this aspect the visual surface of the system is the polarized window as previously discussed.

In another aspect, textured surface 30 may be a theatrical scrim. For example, the theatrical scrim is a material having a wide weave with part of the material being at least partially transparent to light. In this aspect, as source polarizer 40 is rotated while directed at the theatrical scrim, the hidden object transitions from a nearly invisible state to, for example, a nearly full visible state.

In yet another aspect, the surface of the theatrical scrim may contain a printed image. In one example, the printed image is a face. In this example, object 10 is a skull. By illuminating the printed image with light source 50 using source polarizer 40 parallel to transmissive axis 25 of polarized window 20, the skull is visible to an observer. Alternatively, changing the polarization of source polarizer 40 parallel to reflective axis 35 of the polarized window 20, the skull is invisible to an observer. In the invisible state, the observer sees the printed image of the face. In the visible state, the observer sees a composite image of the printed face and the skull.

In another alternative, textured surface 30 may be a partial mirror. The partial mirror transmits a percentage of incident light while reflecting another percentage of incident light. For example, the partial mirror may be a DBEF. In this alternative, as source polarizer 40 is rotated while pointed at the partial mirror causes object 10 transitioning from a nearly invisible state to a nearly fully visible state. In this aspect, the partial mirror is a DBEF.

In another alternative, light source 50 may be replaced with a hand held flashlight with source polarizer 40 that is fixed in position. In this aspect, light source 50 is a portable device that may be repositioned by an observer. This aspect allows the observer to interact with the object. Thereby, the observer can actively cause the object to appear or disappear. In another aspect, source polarizer 50 may be located on the hand held flashlight is allowed to freely rotate.

In yet another alternative, light source 50 can be replaced with a video projector. For example, the video projector may project a single light color for illuminating object 10. In yet another aspect, textured surface 30 may be a projected image from a video projector. In the alternative, the projected image provided by the video projector is one or more moving images.

Information as herein shown and described in detail is fully capable of attaining the above-described object of the disclosure and the present embodiments of the disclosure, and is, thus, representative of the subject matter, which is broadly contemplated by the disclosure. The scope of the disclosure fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described embodiment and additional embodiments that are known to those of ordinary skill in the art are hereby expressly incorporated by reference and are intended to be encompassed by the present claims.

Moreover, no requirement exists for a device or method to address each and every problem sought to be resolved by the disclosure, for such to be encompassed by the present claims. Furthermore, no element, component, or method step in the present disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set forth in the appended claims. No claim herein is to be construed under the provisions of 35 U.S.C. § 112, sixth paragraph, unless the element is expressly recited using the phrase "means for."

What is claimed is:

1. A projection system for making an object appear or disappear behind a textured surface to an observer comprising:
    a polarized window placed in front of an object, the polarized window having a transmissive axis and a reflective axis;
    a polarization maintaining backplate behind the object;
    a textured surface placed in front of the polarized window that is at least partially transparent, and
    a polarized light source placed in front of the textured surface and configured to transmit polarized light toward the textured surface, the object, and the backplate;
    wherein adjusting the polarization of the polarized light causes an image of the object, as viewed by an observer positioned between the polarized light source and the textured surface, to transition, from being visibly projected from the backplate onto the textured surface to being invisible to the observer in front of the textured surface, and wherein the polarization of observed light is the same as the polarization of the polarized light source.

2. A system as described in claim 1 wherein polarized light oriented substantially parallel to the reflective axis of the polarized window passes through the textured surface, and is reflected by the polarized window, preventing viewing of the object.

3. A system as described in claim 1 wherein polarized light oriented substantially parallel to the transmissive axis of the polarized window passes through the textured surface and the polarized window, allowing viewing of the object.

4. A system as described in claim 1 further including a reflective back plane for reflecting light transmitted through the object for increased illumination of the object.

5. A system as described in claim 1 wherein the object is a thin film material mounted on a clear acetate material.

6. A system as described in claim 1 wherein the textured surface is a thin film material deposited on a clear acetate material.

7. A system as described in claim 1 wherein the object is two-dimensional thin film on a wall surface.

8. A system as described in claim 1 wherein the system is a thin film system adapted to fit into a small area.

9. A system as described in claim 1 wherein the system is a thin film system mounted on a wall.

10. A system as described in claim 1 wherein the system has two states corresponding to a disappearing state for the object and a reappearing state for the object.

11. A system as described in claim 1 wherein the system having multiple states for gradually transitioning an object from a visible state to an invisible state.

12. A method for making an object mysteriously appear in front of, or disappear behind a textured surface to an observer comprising:
    providing a polarized window, the polarized window comprising a transmissive axis and a reflective axis;
    placing an object behind the polarized window and in front of a reflective backplate;
    providing a textured surface in front of the polarized window; and
    illuminating the polarized window with a light source directed toward the backplate and adapted to be polarized such that light that is oriented parallel to the reflective axis of the polarized window passes through the textured surface, and is reflected by the polarized window, preventing viewing of an image of the object by an observer positioned between the polarized light source and the textured surface, and light that is oriented parallel to the transmissive axis of the polarized window passes through the textured surface and the polarized window, allowing viewing of the image of the object projected onto the textured surface, and wherein the polarization of observed light is the same as the polarization of the light source.

13. The method as described in claim 12 wherein the polarized window is a thin film reflective polarizer film.

14. The method as described in claim 12 wherein the polarized window is a Dual Brightness Enhancement Film.

15. An optical system for causing the appearance of a first object in front of, or disappearance behind a second object comprising:
    a light source for projecting light on a reflective backplate;
    a rotatable source polarizer between the light source and the backplate for polarizing the light projected from the light source;
    a polarized window positioned between the source polarizer and the backplate, the polarized window having both a transmissive axis and a reflective axis, the polarized window transmitting light polarized in the same plane as the transmissive axis, and reflecting light polarized in the same plane as the reflective axis;
    a first object located between the polarized window and the backplate;
    a second object located in front of the polarized window, between the source polarizer and the polarized window, the second object being at least partially transparent, and
    wherein rotating the source polarizer causes the first object to transition from being visible to being invisible to an observer positioned between the source polarizer and the second object, and wherein the polarization of the observed light is the same as the polarization of the source polarizer.

16. The system of claim 15 wherein positioning the source polarizer such that the transmissive axis of the source polarizer is substantially parallel with the transmissive axis of the polarized window shows the object in front of the textured surface.

17. The system of claim 15 wherein positioning the source polarizer such that the transmissive axis of the source polarizer is substantially orthogonal to the transmissive axis of the polarized window shows only the textured surface.

18. The system of claim 15 wherein positioning the source polarizer such that the transmissive axis of the source polarizer is substantially parallel with the reflective axis of the polarized window shows only the textured surface.

19. The system of claim 15 wherein the polarized window is a Dual Brightness Enhancement Film.

20. The system of claim 15 wherein the transmissive axis is substantially orthogonal to the reflective axis.

21. The system of claim 1 wherein the transmissive axis is substantially orthogonal to the reflective axis.

* * * * *